United States Patent [19]

Kramberg et al.

[11] Patent Number: 4,766,700
[45] Date of Patent: Aug. 30, 1988

[54] METHOD AND APPARATUS FOR DETERMINING THE POSITION OF A WORKPIECE IN AN NC-CONTROLLED MACHINE

[75] Inventors: Gerhard Kramberg, Esslingen; Horst Kühne, Remseck, both of Fed. Rep. of Germany

[73] Assignee: Fortuna-Werke Maschinenfabrik Gesellschaft mit beschrankter Haftung, Stuttgart, Fed. Rep. of Germany

[21] Appl. No.: 810,489

[22] Filed: Dec. 18, 1985

[30] Foreign Application Priority Data

Dec. 18, 1984 [DE] Fed. Rep. of Germany ....... 3446138

[51] Int. Cl.$^4$ .......................... B24B 49/00; B24B 49/12
[52] U.S. Cl. ............................ 51/165.74; 51/105 SP; 51/289 R; 51/165.72
[58] Field of Search ............ 51/165.77, 165.76, 103 C, 51/281 R, 289 R, 327, 72, 165.74, 165.75, 165.72, 165.86, 105 SP, 165.71

[56] References Cited

U.S. PATENT DOCUMENTS

| 3,653,161 | 4/1972 | Clark | 51/289 R |
| 3,877,151 | 4/1975 | Roberts | 51/289 R |
| 4,294,045 | 10/1981 | Enomoto | 51/165.77 |

Primary Examiner—Frederick R. Schmidt
Assistant Examiner—Bradley I. Vaught
Attorney, Agent, or Firm—Becker & Becker, Inc.

[57] ABSTRACT

A method wherein the position of a workpiece of an NC-controlled machine is determined, and an apparatus which includes at least one center point and a computing unit. The position of the center point is ascertained by a measuring device and the measured value is fed as a signal into the computing unit. Using the computing unit and the measurement signal, the position of the center point and, thus of the workpiece can be determined. The measuring device is associated with a tailstock of the apparatus and is connected to the computing unit. The measuring device is integrated in the apparatus, so that no additional measuring unit is required. It is also not necessary to provide an installation area for such a measuring unit in the region of the workpiece.

7 Claims, 3 Drawing Sheets

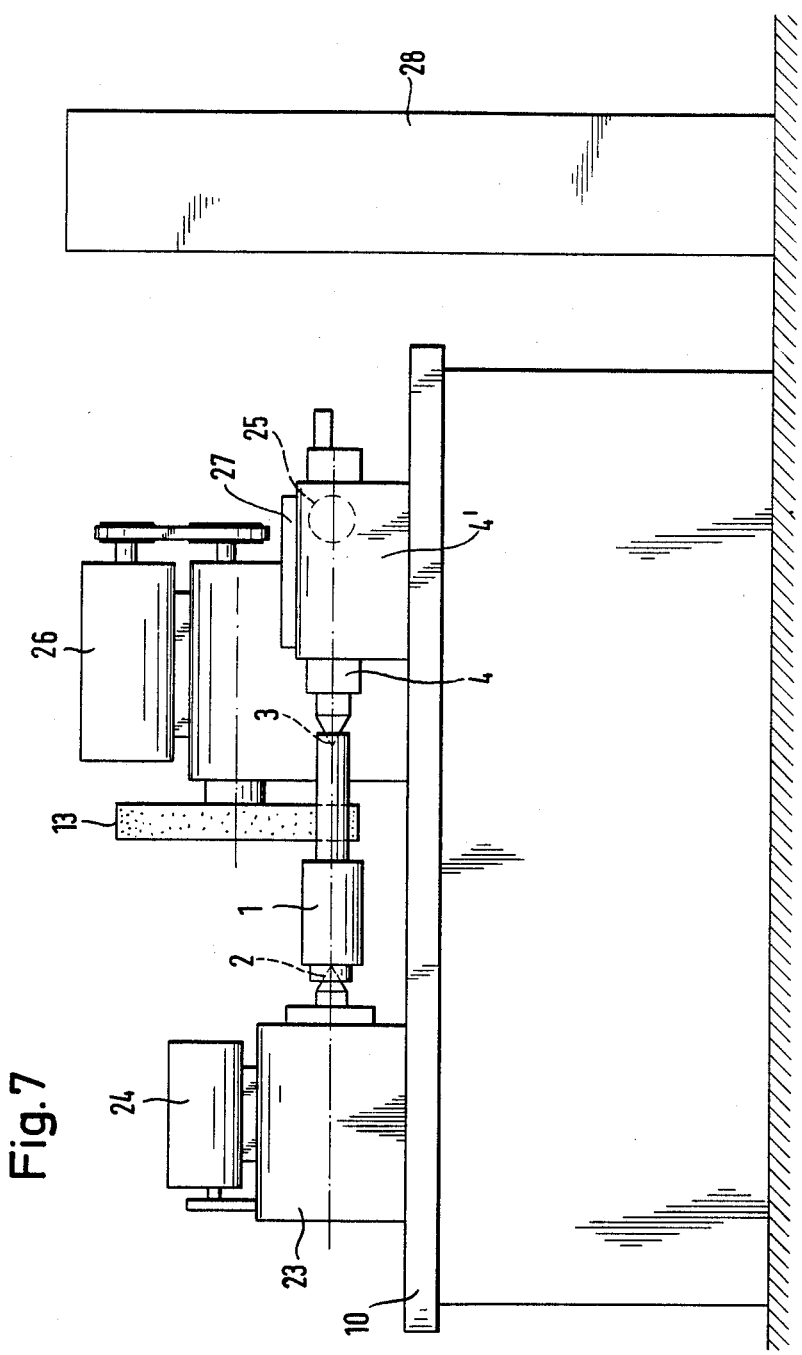

4,766,700

METHOD AND APPARATUS FOR DETERMINING THE POSITION OF A WORKPIECE IN AN NC-CONTROLLED MACHINE

BACKGROUND OF THE INVENTION

1. Field of the Invention

The invention relates to a method for determining the position of a workpiece in an NC-controlled machine comprising at least one center point and a computing unit, wherein the workpiece is fixed and the position of at least one point of the workpiece is ascertained by at least one measuring device. The invention also relates to an apparatus that is provided with a movable machine table, on which at least one tailstock is mounted and which is adjustable in relation to the machine table, and with an arithmetic unit for carrying out such a method.

2. Description of the Prior Art

When machining workpieces in NC-controlled machines, both before and during machining the workpieces must have a precise position with respect to the grinding wheel. The workpieces to be machined have tolerances within a series, and these must be taken into consideration at the time of positioning. Separate measuring apparatus are used for this. These measuring apparatus are arranged on the machine and are used to determine the position of the workpiece. This measuring operation is complicated and expensive, since the measuring apparatus has to be re-aligned with respect to the workpieces in each case. If two surfaces must be measured on the workpiece, for example, the measuring apparatus must be brought into two different measuring positions. Hence, a method of this type is time consuming and therefore expensive. The capacity of the NC-controlled machine can consequently not be fully utilized. In addition, it frequently causes problems to be able to position the measuring apparatus on the machine at all.

An object of the present invention to provide a method and an apparatus which determines the position of the workpiece within the shortest time and in the simplest manner, even in those machines in which only a small installation space is available for a measuring apparatus.

BRIEF DESCRIPTION OF THE DRAWINGS

This object, and other objects and advantages of the present invention, will appear more clearly from the following specification in conjunction with the accompanying drawings, in which:

FIG. 7 is a schematic view of an embodiment of the apparatus according to the present invention.

SUMMARY OF THE INVENTION

In the method according to the invention, the computing unit of the NC-controlled machine is used for determining the position of the workpiece. The position of the center point or of the tailstock depends on the position of the workpiece in the machine. Therefore, the position of the workpiece can be ascertained, using the computing unit, from the position of the tailstock which is determined by means of the measuring device. The position of the center point and, thus, of the workpiece can be ascertained quickly and simply in the computing unit from the signal supplied by the measuring device.

The invention is further characterized in that the measuring device is integrated in the apparatus according to the invention, so that no additional measuring apparatus is necessary for determining the position. Consequently, the position determinations can be carried out very simply and quickly when machining a series of workpieces. Since the position of the tailstock is ascertained by means of the measuring device, it is not necessary to provide an installation or mounting area for a measuring apparatus, or the like, in the region of the workpiece. Therefore, the inventive apparatus may have a compact construction.

DESCRIPTION OF THE PREFERRED EMBODIMENT

Figure 1:
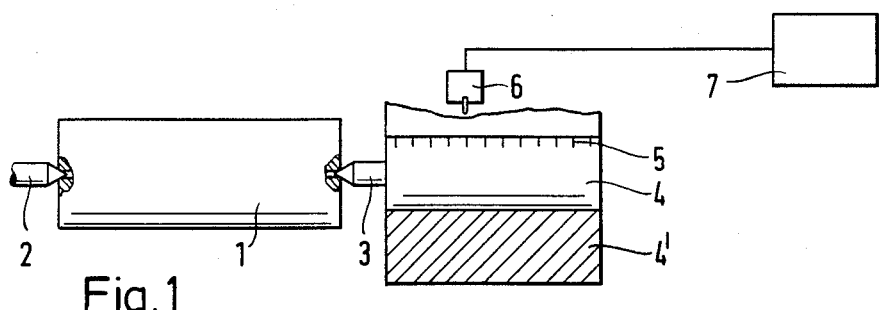
FIG. 1 is a schematic view of a portion of a first embodiment of an apparatus according to the present invention.
Figure 2:
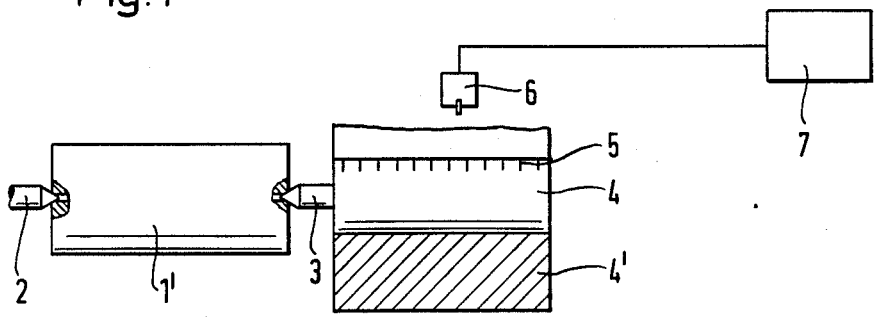
FIG. 2 is a view that shows the apparatus according to FIG. 1, in which a shorter workpiece is provided.

Referring now to the drawings in detail, FIGS. 1 and 2 show diagrammatically an apparatus which is NC-controlled. In the apparatus a workpiece 1 is clamped between two center points 2, 3. The center point 3 is part of a sleeve 4, which is located in a tailstock 4' and which is movable or adjustable relative to the machine table 10. The center point 2 is part of a headstock 23 which is disposed on the machine table 10. A rotary drive 24 serves to turn the workpiece 1, i.e. the center point or pivot 2. A motor 25 is positioned in the tailstock 4' and effects the movement of the sleeve 4. An NC-unit 27 is located on the tailstock 4' for the movement of the sleeve 4. Next to the apparatus stands a control panel 28 for the NC-control. The sleeve 4, or another member which is able to move relative to the machine table, supports a measuring scale 5, by means of which the position of the center point 3 can be ascertained. For this purpose a scanning head 6 is provided, which is connected to the computing unit 7 of the NC-machine.

With the embodiment of the apparatus which is shown in FIGS. 1 and 2, recognition of the workpiece type with respect to the workpiece length can be carried out. When the workpiece 1 is clamped between the center points 2, 3, the center point 3 assumes a fixed position in relation to the scanning head 6, which is disposed in a stationary manner. The position of the center point 3 can be determined by means of the measuring scale 5 and be fed, in the form of a signal, into the computing unit 7. The position of the center point 2 can be previously programmed into the computing unit 7, but can also be fed into the computing unit 7 after being determined by means of a corresponding measuring device 5, 6. The length of the workpiece 1 can be determined from the position of the center points 2, 3. According to whether a longer or shorter workpiece 1, 1' (FIG. 2) is clamped between the center points 2, 3, the center point 3 adopts a different position. This is fed by means of a scanning head 6 into the computing unit 7. From this it is again possible to recognize the length of the workpiece 1'. If the position of the center point 2 is not ascertained or not programmed, the change of position of the center point 3 alone is used for recognizing the type of workpiece. Thus, the length of the workpieces to be machined, and, hence, recognition of the workpiece type, can be carried out by means of the measuring system 5, 6. Since an output from the scanning head 6 is connected to an input of the computing unit 7 of the NC-machine, the measurement can be carried out precisely without difficulties, even in the case of limited accommodation. In particular, there is no requirement for a separate measuring device, which would have to be located on the apparatus and would have a corresponding space requirement.

Figure 3:
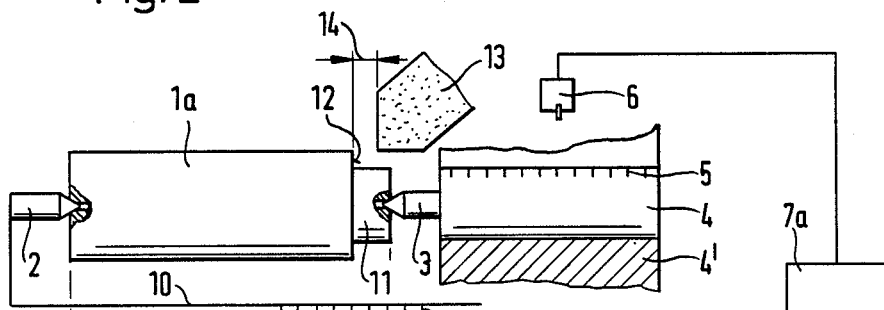
FIG. 3 is a schematic view of a portion of a second embodiment of an apparatus according to the invention, with a workpiece positioned so that an end face may be machined.
Figure 4:
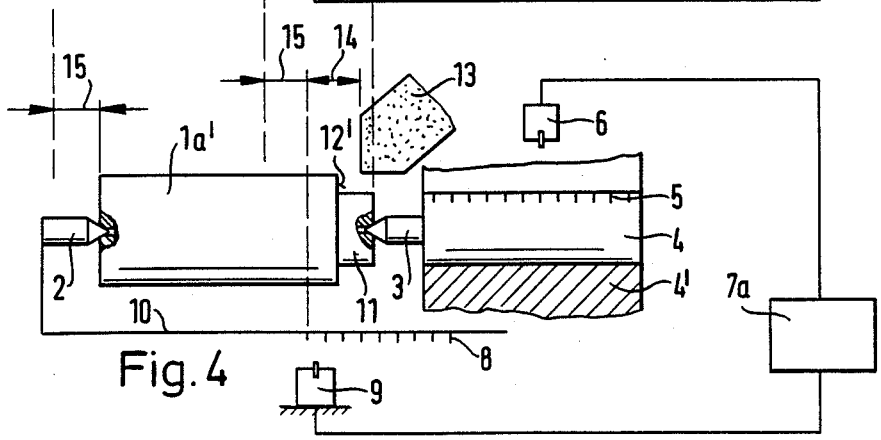
FIG. 4 is a view that shows the apparatus according to FIG. 3, in which is provided a shorter workpiece to be machined.

In the machine or apparatus according to FIGS. 3 and 4, a second measuring system 8, 9 is provided, which likewise consists of a measuring scale 8 and a scanning head 9, with its output being connected to an input of the computing unit 7a and with the ascertained values being fed as signals into the computing unit. The measuring scale 8 is provided on a machine table 10, on which the center point 2 is mounted. The workpiece 1a, which is clamped between the two center points 2 and 3, has an axial, narrow projection 11. The workpiece 1a is machined on its end face 12 with, in this embodiment, a form wheel 13 which is rotatably driven by a motor 26 (FIG. 7). In order that the required amount can be ground off from the end face 12, it is necessary to know the position of the end face 12. After the workpiece 1a is clamped between the two center points 2 and 3, the end face 12 of the workpiece 1a to be machined has a clearance 14 from the form or grinding wheel 13. The machine table 10, together with the tail spindle 4', is now moved very slowly towards the form wheel 13, until the end face 12 comes to bear against the form wheel 13. In this position of contact, the positions of the center point 3 and of the machine table 10 are reported or signaled by means of the scanning heads 6, 9 to the computing unit 7a of the NC-machine, where they are stored. If similar workpieces are to be machined in succession on the apparatus, by means of the stored clearance 14 and the stored position of contact of the workpiece with the form wheel 13 the respective workpiece to be machined can be moved automatically, and in the shortest time, into its machining position.

FIG. 4 shows a workpiece 1a', which is shorter than the workpiece 1a which is shown in FIG. 3. For clamping this shorter workpiece 1a', the center point 2 is moved back into the same initial or starting position, which it assumes when clamping the longer workpiece 1a. Since the workpiece 1a' is shorter, if the measuring devices 5, 6 and 8, 9 were not present, the machine table 10 and the center point 3 would have to be moved at a crawl until they come into contact with the form wheel 13. Due to the shorter length of the workpiece 1a', this adjusting or forward movement is longer than in the case of the longer workpiece 1a shown in FIG. 3. This longer adjusting movement takes time, so that an apparatus of this type could not operate at full capacity. However, in this embodiment, as a result of the measuring devices 5, 6 and 8, 9, the adjusting movement and, thus, the adjusting time are considerably reduced and accordingly the capacity of the machine is substantially increased. The length of the clamped workpiece 1a' can be ascertained immediately by means of the measured values supplied by the two scanning heads 6 and 9. Since the length of the previously machined workpiece 1a has been stored in the computing unit 7a, by comparing the two workpiece lengths ascertained, it is simple to discover how much shorter the workpiece 1a' is than the workpiece 1a. Since the workpiece 1a' is likewise to be machined by means of the form wheel 13 on its end face 12', it must be guided towards the grinding wheel. Since the length of the workpiece 1a' has been ascertained by the computing unit 7a, and the clearance 14 from the form wheel 13 has been stored in the computing unit 7a, it is possible to determine with the latter how far the workpiece 1a' must be moved towards the form wheel 13 apart from the clearance 14. When the actual measured value differs from the reference value, the computing unit emits a control signal for moving the machine table 10. Thus, controlled by the computing unit 7a, the machine table 10 can be moved in rapid-return motion so far towards the form wheel 13 until the end face 12' has the clearance 14 from the form wheel 13. In FIG. 4 this adjusting movement is designated by the reference numeral 15. As soon as the end face 12' has attained the clearance 14 from the form wheel 13, a change is made to slow-speed operation, so that the workpiece 1a' is fed slowly to the form wheel 13.

With the apparatus shown in FIGS. 3 and 4, during the positioning of the workpiece 1a', its length is already taken into consideration. As a result of this, shorter workpieces 1a' do not need to be moved at slow speed over the entire distance from the form wheel 13. Instead, with the assistance of the computing unit 7a, the shorter workpiece is guided at high speed away from the clearance 14 towards the form wheel 13. Only then does one change over to slow speed. Irrespective of whether a long or short workpiece is clamped in the apparatus, the workpiece is guided at slow speed over the length of the clearance 14 only towards the form wheel 13. Hence, in comparison with known machines, the adjusting times for positioning of the workpieces are considerably reduced and, thus, the capacity of the machine is substantially increased. In addition, as a result of the aforedescribed automatic control, the clearance 14 may be kept very small, due to which the adjusting time is reduced further.

Naturally, longer workpieces than the workpiece 1a shown in FIG. 3 can be clamped in the apparatus. In this case, it is also ascertained automatically, by means of the two measuring devices 5, 6 and 8, 9, by how much this workpiece is longer. Depending on the distance of the end face of this longer workpiece which is to be machined, it is then positioned automatically at the clearance 14, controlled by the computing unit.

Figure 5:
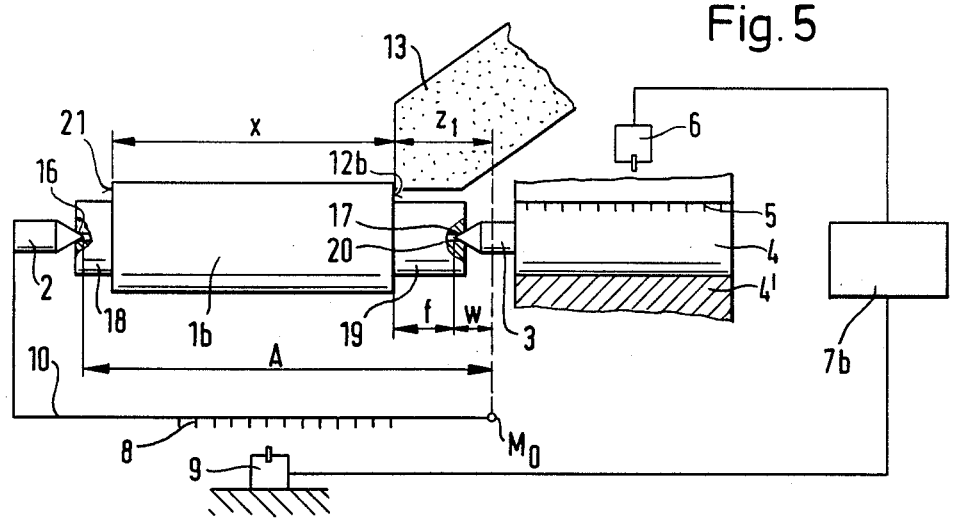
FIG. 5 is a schematic view of a third embodiment of an apparatus according to the present invention, with which a dimension f is ascertained as a reference for a length x that is to be produced.
Figure 6:
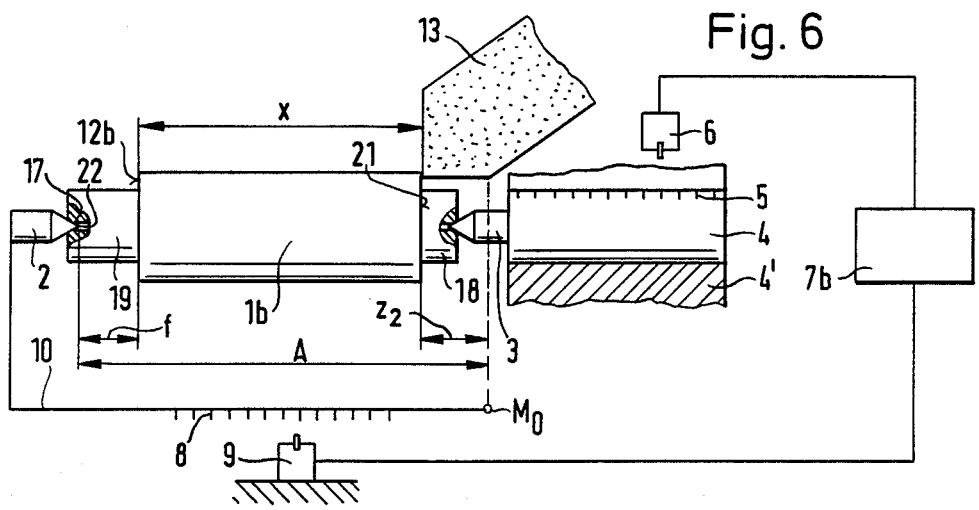
FIG. 6 is a view that shows the apparatus according to FIG. 5, in which, after the machining of one end face, the workpiece is turned through a 180° angle and is re-clamped, and with which a length x is to be produced on a workpiece.

With the machine according to FIGS. 5 and 6, it is possible to produce automatically and accurately a required length x on the workpiece 1b. This distance x is measured from a reference point, i.e. the end face 12b, which is a further surface on the workpiece 1b. With this apparatus it is possible to engage opposing axial positions on the workpiece 1b without having to use a separate positioning apparatus. In practice, workpieces of the same series to be ground have different center depths. Thus, depending on the workpiece, with the same adjustment of the machine, the center point 3 assumes a different position. The sleeve 4, or other suitable machine member, again support the measuring scale 5, which is associated with the scanning head 6. The machine table 10 is provided with the measuring scale 8 for the scanning head 9. The workpiece 1b is again clamped between the two center points 2 and 3, which each engage in a recess 16 and 17 in the end faces of end sections 18 and 19 of the workpiece of reduced diameter. The workpiece 1b is moved, in the aforedescribed manner, towards the grinding wheel 13 and the end face 12b is ground or machined. A zero point $M_O$, with reference to the machine, is stored in the computing unit 7b. When the grinding operation is terminated, the distance $z_1$ of the grinding wheel 13 from the zero point $M_O$ is stored. The position of the center point 3 and, thus, the distance w of the point 20 of the center point 3 from the zero point $M_O$ with reference to the machine can be determined by means of the measuring device 5, 6 from the position of the center point 3. This ascertained value w is also fed into the computing unit 7b. From the two values $z_1$ and w, according to the equation $f = z_1 - w$, the distance f of the point 20 from the finished machined end face 12b of the workpiece 1b can be calculated.

Then the workpiece 1b, which is machined at one end face 12b, is turned 180° and is again clamped between the two center points 2, 3 (FIG. 6). The other end face 21 of the workpiece 1b is now ground with the grinding wheel 13. This end face must be ground or machined until the distance x between the two end faces 12b and 21 is reached. A signal for terminating the grinding or machining process is then produced and the grinding process stops. The following equation is used for this:

$$A = f + x + z_2$$

A is a parameter which is stored in the computing unit 7b, and which results from the distance between the zero point $M_O$ relative to the machine and the free end 22 of the center point 2. A may also be the distance between the stored zero point $M_O$ and the recess 17 in the workpiece 1b. f is the distance between the machined end face 12b and the recess 17 in the end section 19 of the workpiece 1b. During machining of the end face 12b, this value f is ascertained by means of the measuring device 5, 6 which is disposed on the side of the sleeve 4), and is stored in the computing unit 7b. x is the required distance between the two end faces 12b and 21 of the workpiece 1b. During machining, the distance f is compared with this required or reference value or distance and, when this value is reached, the machining operation is interrupted.

$z_2$ is the respective distance between the zero point $M_O$ relative to the machine and the end face 21 which is to be machined. During machining of the end face 21, the workpiece 1b is moved with the machine table 10 in accordance with the material removed from its end face. Because of this, the value A varies. The position of the machine table 10 and, thus, of the workpiece 1b can be ascertained with the measuring device 8, 9 and, hence, the dimension A can be calculated. By means of the above equation, the value x can be calculated therefrom continuously during the grinding operation and be compared with the stored reference value. When the actual value corresponds to the reference value, the grinding or machining operation is stopped. The machined workpiece 1b then has the required collar width x. In the manner described, the workpieces of a series can be produced precisely and without difficulties, with each workpiece having the required collar width x. Even if the workpieces of a series have greater tolerances, they can be produced with the required accuracy in the aforedescribed manner.

In the various embodiments, the aforedescribed measuring devices each include a measuring scale and a scanning head. The scanning head may be a rotary pulse transmitter, whereas the measuring scale may be a linear scale, an incremental scale, an absolute scale, or any similar scale. In order to be able to ascertain contact of the respective workpiece with the tool, sensors are provided, for example, surface contact sensors, which emit a signal as soon as this contact takes place. This signal is then used to terminate the feed movement Instead of the initial position determined by the contact between the workpiece and tool, a position programmed into the computing unit may be used, and the respective workpiece to be machined may be brought into this position. A chip is then removed, with the respective tool, from the workpiece which is located in this programmed position. After the chip removal, the machined side of the workpiece is used as a reference surface and the position of this machined reference surface is stored in the computing unit. The dimension f (FIGS. 5 and 6) can thus be determined either by reporting of the position of the reference surface by a sensor or by removal by cutting.

The aforedescribed NC-machines can be used for grinding or turning rotationally symmetrical workpieces.

The present invention is, of course, in no way restricted to the specific disclosure of the specification and drawings, but also encompasses any modifications within the scope of the appended claims.

What we claim is:

1. A method of determining the position of a workpiece in a numerically controlled machine having at least one center point and a computing unit, said method in combination including the steps of:
    clamping said workpiece in said machine;
    using a first measuring device to determine the position of at least one reference point on the workpiece;
    using said first measuring device to determine the position of said center point;
    feeding the measured value of said center point in the form of a signal to a computing unit;
    determining the position of said workpiece from differing signals obtained from the measured value of said center point with which said workpiece is held in a machining position; providing a movable machine table for moving a workpiece during machining; using a second measuring device to determine the position of said machine table; feeding the measured value of said position in the form of a signal to a computing unit; and
    on a machine side, using said second measuring device to measure a distance x from said reference point and on a first surface of said workpiece during machining.

2. A method according to claim 1, further including the steps of comparing said actual measured value of said first measuring device with a reference value which is stored in said computing unit, with said computing unit emitting a control signal for moving said machine table when said actual value differs from said reference value.

3. A method according to claim 1, wherein said reference point is a second surface on said workpiece.

4. A method according to claim 3, further including the steps of machining said second surface and using said first measuring device to determine the distance between said second surface and a recess which is provided in said workpiece.

5. A method according to claim 4, further including the steps of comparing said distance between said second surface and said recess with a reference value and stopping the machining operation when said reference value is reached.

6. A method for determining the position of a workpiece in a numerically controlled machine having a machine table as well as at least one center point and a computing unit, said method including the steps of:
clamping said workpiece in said machine;
using a first measuring device to determine the position of at least one reference point on the workpiece;
feeding the measured value of said center point in the form of a signal to a computing unit;
using said first measuring device to determine said center point;
providing a movable machine table for moving a workpiece during machining;
using a second measuring device to determine the position of said machine table;
feeding the measured value of said position in the form of a signal to a computing unit; on a machine side, using said second measuring device to measure a distance x from said reference point which is a second surface on said workpiece and on a first surface of said workpiece during machining;
turning said workpiece after said second surface has been machined; using said second measuring device during the machining operation of said first surface of said workpiece, to determine the distance between said workpiece and said second surface; comparing this measured value with a corresponding reference value, and producing a signal for terminating the machining operation when said measured value equals said reference value.

7. A method according to claim 6, further including the steps of, during machining and after turning said workpiece, measuring the distance between a stored zero point relative to said NC-machine and said recess in said workpiece; and using this measured value to calculate the distance between said second and said first surfaces.

* * * * *